(12) United States Patent
Pan

(10) Patent No.: US 8,004,557 B2
(45) Date of Patent: Aug. 23, 2011

(54) ADVANCED DYNAMIC STITCHING METHOD FOR MULTI-LENS CAMERA SYSTEM

(75) Inventor: Patrick Pan, Taipei (TW)

(73) Assignee: Sony Taiwan Limited, Taipei (TW)

( * ) Notice: Subject to any disclaimer, the term of this patent is extended or adjusted under 35 U.S.C. 154(b) by 419 days.

(21) Appl. No.: 12/229,285

(22) Filed: Aug. 20, 2008

(65) Prior Publication Data
US 2009/0051778 A1 Feb. 26, 2009

(30) Foreign Application Priority Data

Aug. 21, 2007 (TW) .............................. 96131012 A

(51) Int. Cl.
*H04N 7/00* (2006.01)
*H04N 5/225* (2006.01)
*H04N 7/18* (2006.01)

(52) U.S. Cl. ........ 348/36; 348/262; 348/159; 348/218.1
(58) Field of Classification Search ................ 348/222.1, 348/262, 264, 36, 38, 39, 143, 159, 218.1
See application file for complete search history.

(56) References Cited

U.S. PATENT DOCUMENTS

| | | | | |
|---|---|---|---|---|
| 5,162,907 A * | 11/1992 | Keating et al. | ........... | 375/240.16 |
| 5,764,809 A * | 6/1998 | Nomami et al. | ............. | 382/284 |
| 5,798,791 A * | 8/1998 | Katayama et al. | ......... | 348/218.1 |
| 5,864,360 A * | 1/1999 | Okauchi et al. | ................. | 348/47 |
| 6,823,080 B2 * | 11/2004 | Iijima et al. | .................... | 382/154 |
| 7,123,291 B2 * | 10/2006 | Horie | ......................... | 348/218.1 |
| 2001/0014171 A1* | 8/2001 | Iijima et al. | ................... | 382/154 |
| 2003/0235344 A1* | 12/2003 | Kang et al. | .................... | 382/284 |
| 2004/0001138 A1* | 1/2004 | Weerashinghe et al. | ........ | 348/36 |
| 2004/0100443 A1* | 5/2004 | Mandelbaum et al. | ....... | 345/158 |
| 2004/0201708 A1* | 10/2004 | Endo et al. | ................. | 348/211.1 |
| 2004/0201769 A1* | 10/2004 | Yoshikawa et al. | ........... | 348/335 |
| 2007/0030396 A1* | 2/2007 | Zhou et al. | .................... | 348/700 |
| 2007/0081091 A1* | 4/2007 | Pan et al. | ...................... | 348/335 |
| 2007/0236595 A1* | 10/2007 | Pan et al. | ...................... | 348/335 |
| 2008/0152088 A1* | 6/2008 | Wang et al. | ................ | 378/98.12 |
| 2009/0058988 A1* | 3/2009 | Strzempko et al. | ............. | 348/36 |

* cited by examiner

*Primary Examiner* — Nicholas G Giles
(74) *Attorney, Agent, or Firm* — Frommer Lawrence & Haug LLP; William S. Frommer

(57) ABSTRACT

An advanced dynamic stitching method for multi-lens camera system is disclosed. This invention aims to address the parallax phenomenon which exists in a multi-lens camera system. Stitching points vary with the object distance. In a video stitching system, a fast search engine to update the stitching points dynamically is needed. This invention provides an advanced method to reduce the high computation power required for the traditional block matching method of finding stitching points. As a result, the stitching points can be adjusted dynamically with the method of this invention.

8 Claims, 5 Drawing Sheets

ADVANCED DYNAMIC STITCHING METHOD FOR MULTI-LENS CAMERA SYSTEM

BACKGROUND OF THE INVENTION

This invention relates to a multi-lens camera system, and more particularly, to a parallax phenomenon of an advanced dynamic stitching method for multi-lens camera system.

DESCRIPTION OF RELATED ART

A multi-lens camera system as claimed in US Patent No. US2004/0201769 A1 uses an optical method to suppress the parallax phenomenon. In the optical method, the lens sets must be put on an exact position. Otherwise the parallax between images will be showed up. It is still necessary to implement a fast stitching point searching engine in video stitching engine to dynamically adjust the stitching point due to the changes in object distance.

SUMMARY OF THE INVENTION

Accordingly, the present invention provides a fast and effective search engine to update stitching points dynamically so that the parallax phenomenon can be compensated.

A multi-lens camera system is consisted of several single lens cameras which face to different directions. In order to make a wide angle image, stitching technology is necessary. However, most of this kind of multi-lens systems have parallax phenomenon, which means the stitching point will shift when an object moves from the near to the far. The present invention aims to provide a method to change the stitching point dynamically to make the image seamless. It can be used in any kind of multiple lens camera system with traditional stitching technology.

Therefore, according to the present invention, an advanced dynamic stitching method which suppresses the parallax phenomenon of multi-lens camera system is disclosed. Using feature detection and edge detection increases the accuracy and saves the computation power of block matching. The improved method in the invention dynamically adjusts the stitching point so that the parallax phenomenon can be ignored, and a seamless stitched image can be produced.

DETAILED DESCRIPTION OF THE INVENTION

Figure 1:
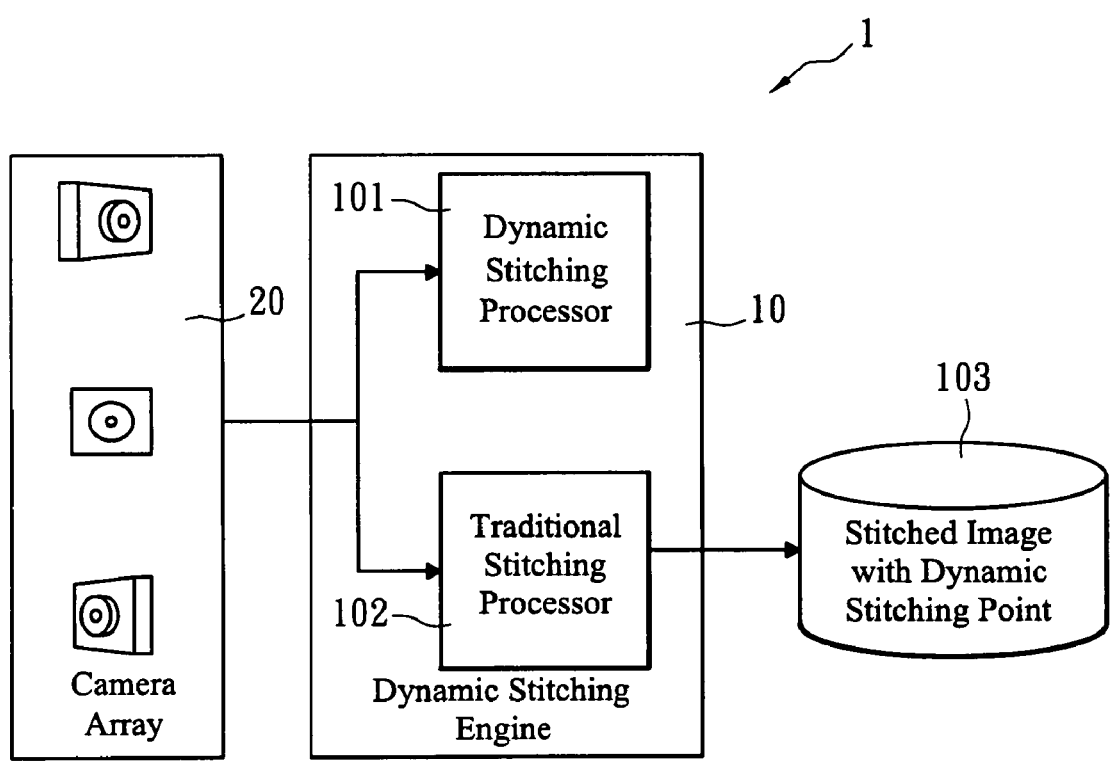
FIG. 1 shows an overview of a dynamic stitching system.

In the following description, like parts are marked with the same reference numerals throughout the specification and drawings.

FIG. 1 describes the overview of a dynamic stitching system 1. A dynamic stitching engine 10 receives images or video streams from a multi-lens camera array 20. An input data is sent to a dynamic stitching processor 101 to update stitching points 122 if the distance of object changes. A traditional stitching processor 102 transforms input images and stitches them into one image according to the updated stitching points 122. Finally, the stitched image with updated stitching points is processed with blending technology to get a seamless wide-angle image for display.

Figure 2:
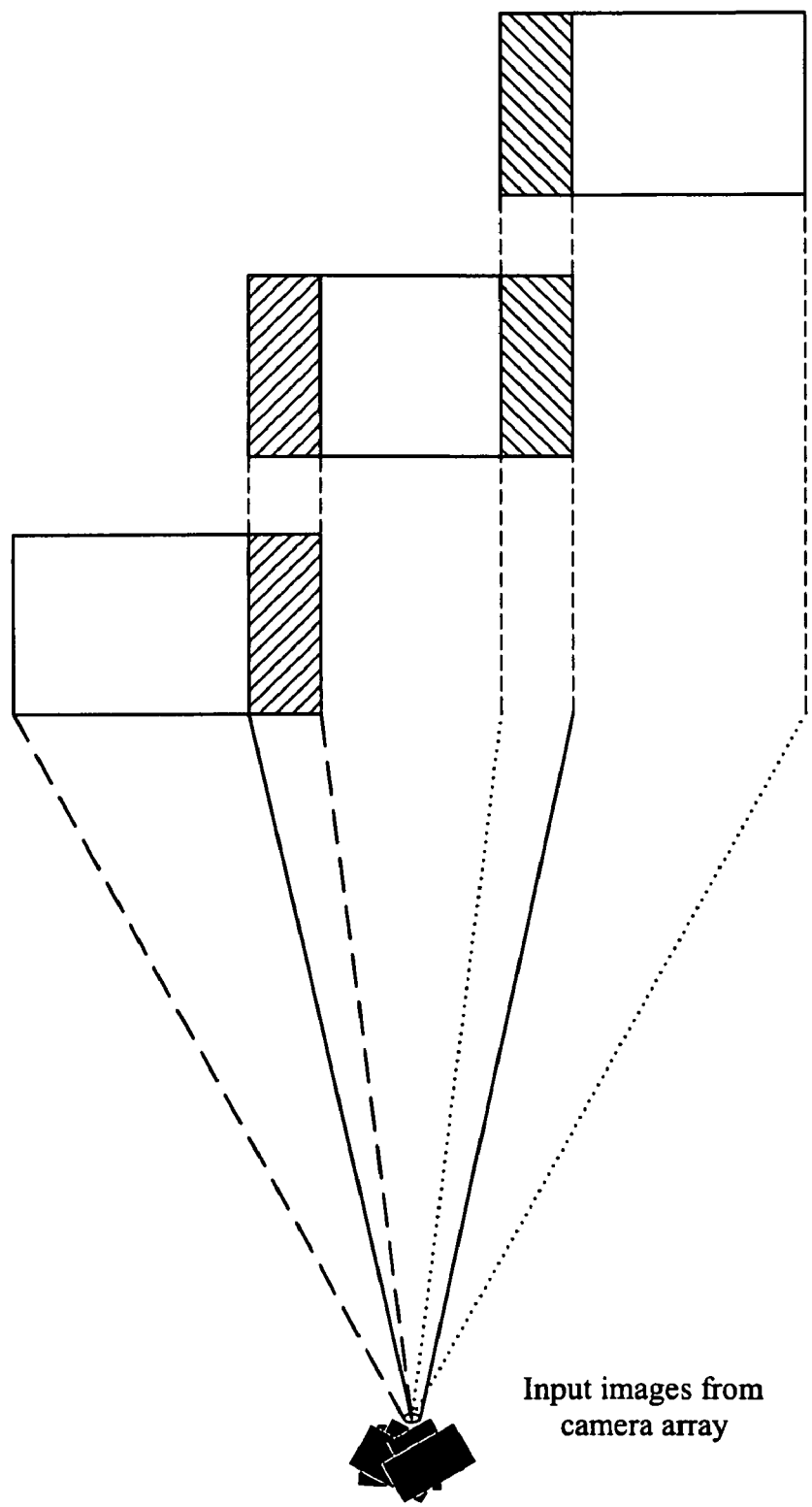
FIG. 2 shows input images from camera array.

FIG. 2 shows an input image from the camera array 20. The shaded areas are overlapped regions between side images (from side camera) and center images (from center camera). The overlapped regions are used for feature detection window in the dynamic stitching engine 10. The features in the overlapped region are the same in both images. Hence, the feature detection window of the dynamic stitching engine 10 is defined in this region.

Figure 3:
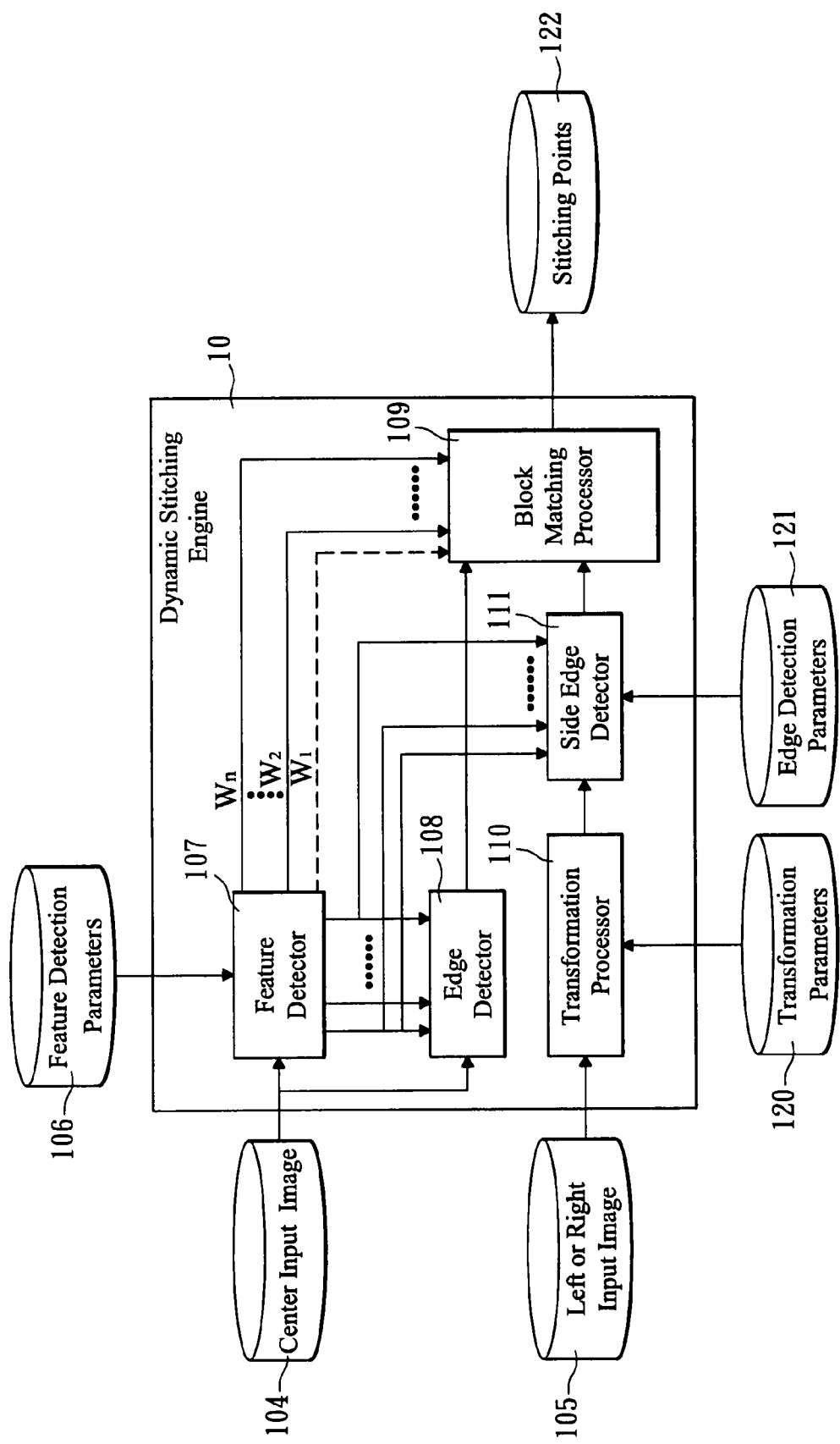
FIG. 3 shows a block diagram of a dynamic stitching engine.

FIG. 3 illustrates the block diagram of the dynamic stitching engine 10. A center input image 104 is first sent to a feature detector 107 and an edge detector 108. The feature detector 107 reads feature detection parameters 106 to find the position of feature points and outputs feature relative coordinates to the edge detector 108. Furthermore, the feature detector 107 can also output weighting of each feature to a block matching processor 109 to get the stitching points 122 more precisely. As long as the edge detector 108 of the center image 104 receives the feature relative coordinates for the feature detector 107, it detects the edge around the features and bi-tones the image into black and white. The block of the edge detector 108 can be parameterized according to the system accuracy requirement and the available computation power.

In the case of a side input image, an input left or right image 105 from the side camera is transformed by a transformation processor 110 to the same surface of the center input image 104. After that, a side edge detector 111 receives the feature relative coordinates of the center image 104 from the center feature detector 107. The side edge detector 111 converts the relative coordinates into its own coordinates. According to these coordinates, the side edge detector 111 defines a block matching window of each feature point which is defined in the feature detector 107. The block matching window is also called a moving window, which is around feature points and bigger than a center edge detection window.

Figure 4:
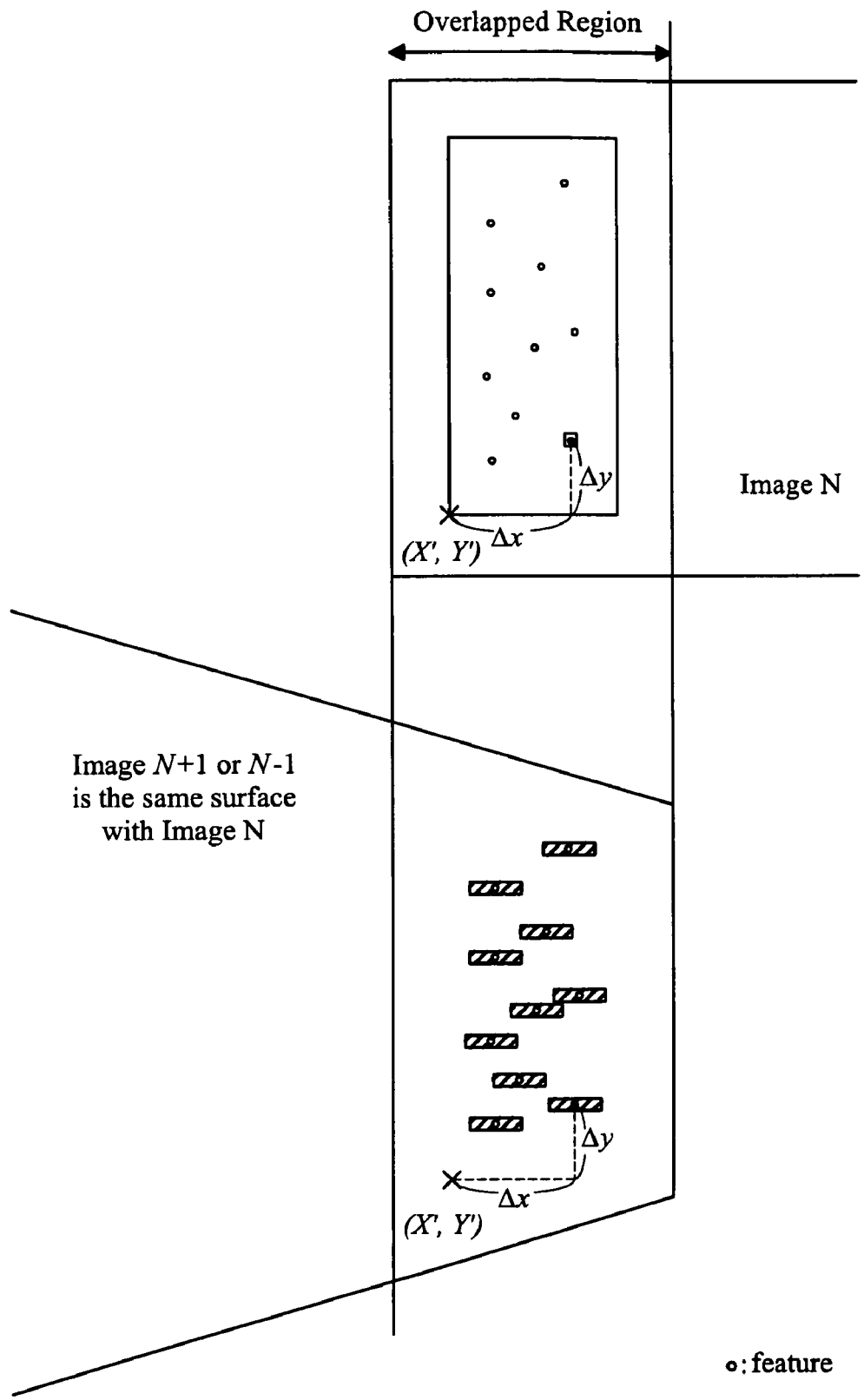
FIG. 4 shows an illustration of feature detector window, edge detector window, and block matching window in the overlapped region.

FIG. 4 illustrates a feature detection window, an edge detection window, and a block matching window in the overlap region.

After edge detectors 108 and 111, a block matching processor 109 performs block matching for the images from the center and side cameras. Besides, the weighting of each feature from the center feature detector 107 can also be considered. In the block matching processor 109, SAD (Sum of Absolute Difference) is calculated and finally a new stitching point 122 is found out to the traditional stitching engine.

Figure 5:
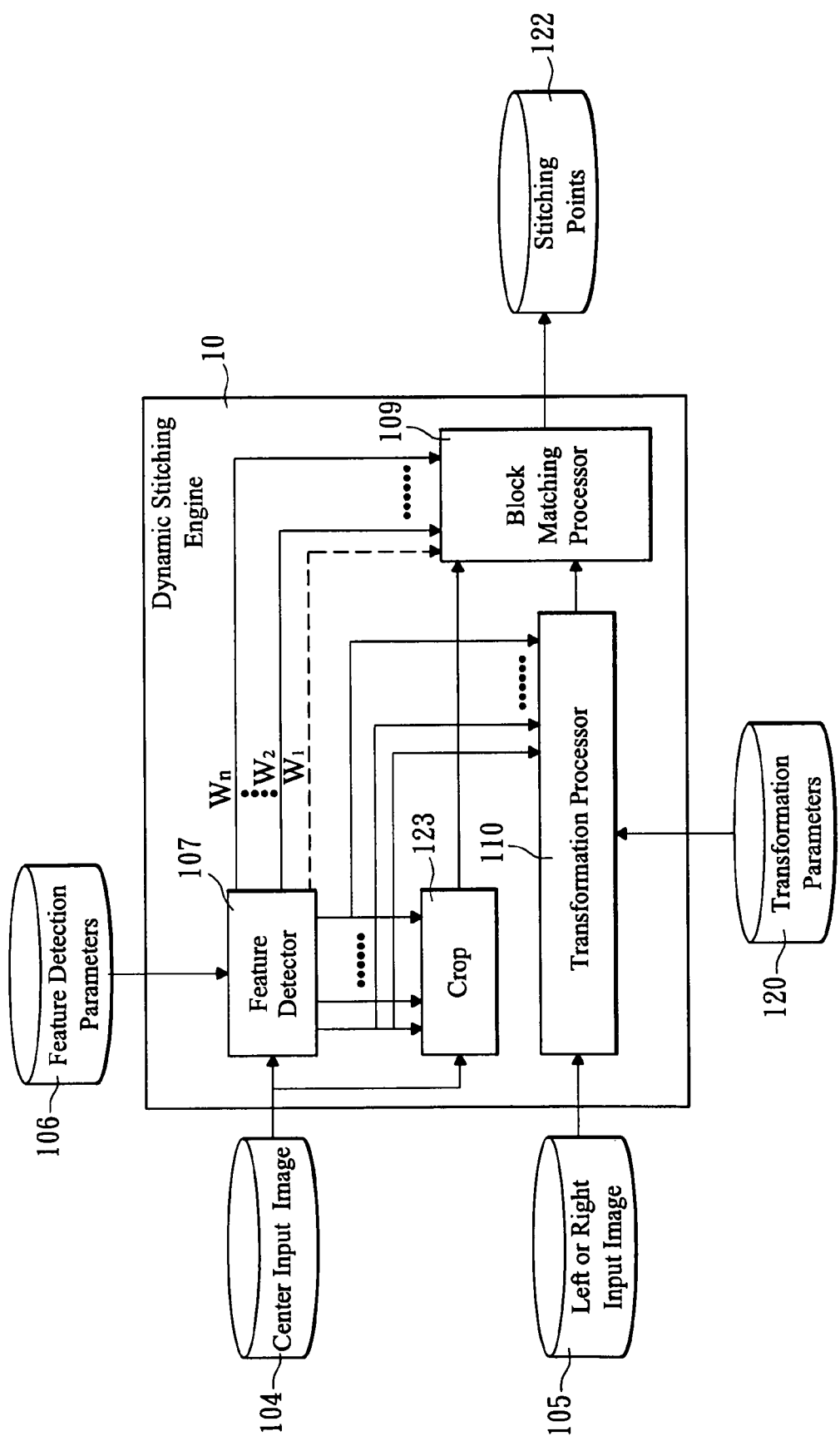
FIG. 5 shows a block diagram of a dynamic stitching engine without edge detector.

FIG. 5 shows a block diagram of the dynamic stitching engine 10 without edge detector 108. The edge detector is introduced to avoid the inaccuracy caused by video noise. The dynamic stitching engine 10 without edge detector 108 loses certain accuracy which is acceptable for a system with lower cost. Hence, the edge detector 108 can be spared for a lower-cost system, where limited computation power is available.

It should be understood by those skilled in the art that various modifications, combinations, sub-combinations and alternations may occur depending on design requirements and other factors insofar as they are within the scope of the appended claims or the equivalents thereof.

The invention claimed is:

1. A multi-lens camera system comprising:
   a camera array configured to capture images as input images;

a dynamic stitching engine configured to have a dynamic stitching processor and a traditional stitching processor for receiving the input images sent from the camera array;

a feature detector configured to read feature detection parameters to find positions of feature points, and output feature relative coordinates and weighting of each feature; and a block matching processor configured to receive the weighting of each feature output from the feature detector, and calculate SAD (Sum of Absolute Difference) of a center image and a side image, wherein the dynamic stitching processor receives the input images from the camera array to update stitching points, and the traditional stitching processor transforms the input images and stitches them into one image according to the updated stitching points.

2. The system according to claim 1, wherein the images captured from the camera array have overlapped regions between images from adjacent cameras.

3. The system according to claim 1 further comprising:

an edge detector configured to receive the feature relative coordinates output from the feature detector, read edge detection parameters to find position of image edge, and output an image that contains only input image edge; and a transformation processor configured to transform a side input image from a side camera to a same surface of a center input image.

4. The system according to claim 3, wherein the images captured from the camera array have overlapped regions between images from adjacent cameras and the feature detector detects multiple feature points within the overlapped regions.

5. The system according to claim 2, wherein multiple block matching windows are defined in the overlapped regions.

6. The system according to claim 5, wherein the multiple block matching windows can be adjusted in size according to parallax of the multi-lens system.

7. The system according to claim 5, wherein the multiple block matching windows are centered in the feature points.

8. An advanced dynamic stitching method for multi-lens camera system according to claim 1.

* * * * *